Figure 1:
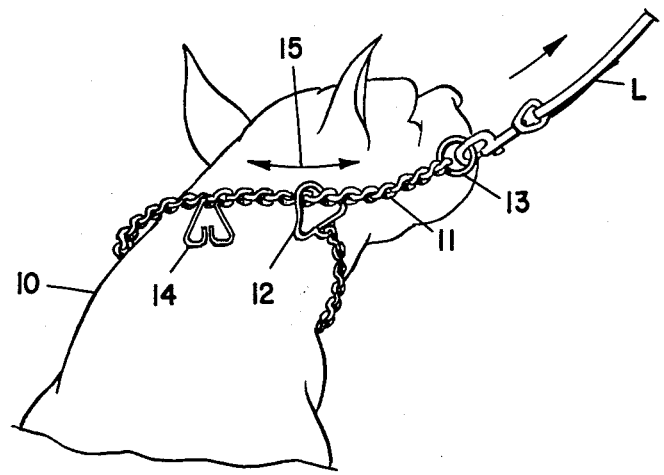

Dec. 1, 1964    G. D. MILLER    3,159,140
METHOD OF TRAINING DOGS AND COLLAR THEREFOR
Filed Aug. 12, 1963

INVENTOR.
GENE DARE MILLER
BY Elliott & Pastoriza
ATTORNEYS

United States Patent Office 3,159,140
Patented Dec. 1, 1964

3,159,140
METHOD OF TRAINING DOGS AND
COLLAR THEREFOR
Gene Dare Miller, 2445½ S. Corinth,
Los Angeles 64, Calif.
Filed Aug. 12, 1963, Ser. No. 301,410
3 Claims. (Cl. 119—29)

This invention relates generally to the training of animals and more particularly, to a novel method and collar device for training dogs.

It is well known that dogs are responsive to high frequency sound waves generally above the normal human audio range. Further, from Pavlov's experiments, it is well known that certain reflexes in dogs may be conditioned by associating a sound with a particular event, such as an action or movement or a spoken word.

With the foregoing in mind, it is a primary object of this invention to provide a novel training method and a novel aid in the form of a collar for carrying out the method. The collar provides high frequency sound waves upon proper manipulation and at appropriate times to effect an association with a spoken word or action to the end that training of dogs in accordance with the method and collar of the invention is greatly facilitated.

More generally, objects of this invention are to provide an improved training aid which is extremely effective in conditioning dogs, is relatively simple to use, and in which dogs may be trained for relatively little expense and in considerably shorter time than has been required heretofore.

Still another important object is to provide a training collar not only useful for training the dog, but which may also be used as a conventional collar.

Briefly, these and many other objects and advantages of this invention are attained by providing a training collar in the form of a chain composed of a series of small individual closed coupled links of a hard metal such as Phosphor bronze to provide high ffrequency sound waves above the normal audio range when struck. One end portion of the chain may include a suitable ring member for attaching a conventional leash. To the other end of the chain is secured a sound generating means which may take the form of a rod member, bent into the shape of a bell dimensioned to prevent the leash connecting means from passing therethrough after a loop is formed so that a permanent loop is defined by the chain. The structure of the bell is such that when properly oriented with respect to the chain portion passing therethrough, varying the size of the loop as by tensioning and relaxing the leash end of the chain causes the chain links to rub or slidingly strike successively the bell thereby generating the desired high frequency waves.

In a preferred embodiment of the invention there is provided an additional sound generating means in the form of a rod member bent into a triangular shape and secured to one of the links in the chain at a point in the looped portion for picking up sound from the links and re-emitting the sounds as high frequency sound waves. This additional member is dimensioned such that it cannot pass through the bell shaped member so that it functions as an anti-choke device as well as a sound generating device.

Figure 2:
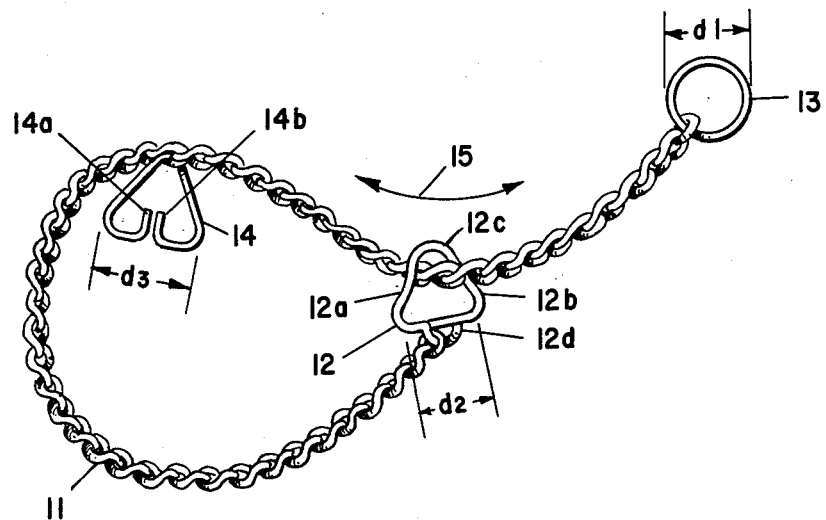

A better understanding of the method and apparatus of this invention will be had by now referring to a preferred embodiment of the collar illustrated in the accompanying drawings, in which:

FIGURE 1 is a perspective view of the training collar of this invention shown in proper position about a dog's neck; and FIGURE 2 is a view showing the training collar itself properly oriented for use.

Referring first to FIGURE 1, there is shown a dog 10 with which the training collar of this invention may be used. As shown, the collar itself comprises a chain 11 formed of small individual links coupled together and constituted of a hard metal alloy such as Phosphor bronze. A first sound generating means 12 is secured to an end of the chain as shown. This means is preferably formed from a metal rod by bending the rod into a closed perimeter generally in the shape of a bell in outline. The structure is such that the end portion of the chain 11 may be threaded therethrough as shown in the drawing. This latter end portion is secured to a ring 13 for coupling to a conventional leash L.

The training collar may also include an additional sound generating means 14 suitably coupled to one of the links in the chain at a portion of the loop. The arrangement is such that the end portion of the chain 11 coupled to the leash L may be tensioned or relaxed to cause the links comprising this portion to slide past the bell shaped member 12 in a back and forth direction such as indicated by the double headed arrow 15. The action of the links sliding against the bell shaped member will generate high frequency sound waves above the normal audio range. The second sound generating member 14 in turn will pick up the sound from the links and in turn emit high frequency sound waves.

FIGURE 2 illustrates the various sound generating means in greater detail. As shown, the sound generating means 12 is of a closed perimeter having concavely curved sides 12a and 12b meeting together in a smoothly rounded upper end 12c. One lower end of the rod member forms a small hook 12d to which the chain end 11 may be secured. The dimensioning of the bell shaped member 12 is such that the leash coupling means in the form of the ring 13 shown at the far end of the chain of FIGURE 2, cannot pass through the bell shaped member. Thus, the outside diameter $d1$ of the ring 13 is greater than the maximum inside diameter $d2$ of the bell shaped member 12 so that the loop in the chain is permanently formed as illustrated in FIGURE 2.

The additional sound generating means is formed by a rod member of hard metal, the mid portion of this rod member being bent to form the vertex of a triangular shape and the ends then being bent towards each other to form the base angles of the triangular shape. These ends are then again bent upwardly in adjacent parallel relationship in a direction towards the vertex as indicated at 14a and 14b. By this particular structure, a "tuning fork" characteristic is imparted to the member 14 so that it is set into sympathetic vibrations by agitation of the links in the chain and will in itself emit high frequency sound waves.

In accordance with a further feature of the invention, the member 14 also serves the function of acting as an anti-choke means. Towards this end, the outside dimension of the member 14 indicated at $d3$ exceeds the inside dimension $d2$ of the bell shaped member 12 so that the member 14 cannot pass through the bell shaped member 12 and thus the size of the loop is limited to a minimum size which is calculated to avoid choking the animal.

In the actual method of training with the training collar, the chain is positioned as shown in both FIGURES 1 and 2, care being taken to make sure that the end portion of the chain connecting to the leash passes under the smoothly curved portion 12c of the bell shape. By so arranging the chain in this manner, smooth sliding action of the various links against the smoothly curved portion 12c can take place when the end of the chain is tensioned and relaxed as indicated by the double headed arrow 15.

In respect to the foregoing, the shape of the bell is an important feature of this invention in that it serves as an orientation device to insure that the chain is properly positioned. There are two ways that the chain can be positioned over the dog's head: one way, in which the bell is upside down, is undesirable but is readily recognizable since it is not possible to effect the two way sliding of the chain through the bell. The other way, in which the bell is right side up when viewed from the dog's right side (or from the trainer's left side) is the correct position and it is only in this position that the chain will slide along the upper curved portion 12c of the bell and thus function properly.

With the chain about the dog's neck, a command is given to the dog and at the same moment, the chain is tensioned or relaxed to cause the various links to rub against the bell shaped member 12 and thus generate the desired high frequency sound waves. The dog will then associate these high frequency sound waves with the spoken word or other act or event to which the dog is to be conditioned.

In accordance with a feature of the training method, alternate use of the chain with the spoken command is employed so that the chain will be actuated or caused to emit sound when a word is spoken and then the word will subsequently be spoken by itself and then when the work is spoken a third time, the chain is again caused to emit sound simultaneously with this word. This alternate process is repeated until the dog obeys the spoken word alone without benefit of the emitted high frequency sound.

It should be understood that in the training method, it is not always necessary to have the chain about the dog's neck. Thus, the chain collar also functions as a throw chain and thus the high frequency sound may be emitted by throwing the chain near the dog at the time a spoken command is given. In this use, a further feature of this invention resides in the provision of a permanent loop in the chain thereby substantially diminishing the possibility of the ends of the chain injuring the dog.

In addition to the use of the collar as a throw chain, it may simply be carried in the hand and used solely as a sound emitting means. In carrying out the method steps in this manner, the dog is guided through various routines by simply zipping or jiggling the chain in the hand. This method has the advantage of eliminating the long ropes presently used between "on leash" and "off leash" training.

From the foregoing description, it will be evident that the present invention has provided a greatly improved training technique for animals. The training collar may be used in the conventional manner for walking the dog or otherwise holding him. The anti-choke feature as a consequence of the provision of the additional sound generating member 14 will insure against inadvertent injury to the animal.

While only a specific embodiment of the invention has been shown and described, small variations falling clearly within the scope and spirit of the invention will occur to those skilled in the art. The training collar and method therefore are not to be thought of as limited to the exact description set forth.

What is claimed is:
1. A training collar comprising, in combination: a chain comprised of small closed links of hard metal to provide high frequency sound waves above the normal audio range when struck; leash connecting means secured to one end of said chain; and a sound generating means in the form of a rod member of hard metal corresponding to the material of said chain, bent into a closed perimeter in the shape of a bell in outline, the upper portion of said bell being smoothly curved and the mid base portion thereof being secured to the other end of said chain so that said other end is prevented from sliding along said base portion, said leash connecting end portion of said chain passing through said closed perimeter defining said bell loosely thereby defining a loop in the remaining portion of said chain for encircling an animal's neck, said chain, when tension is applied thereto, being guided up into and confined within said upper portion of said bell opposite said mid-base portion as a consequence of said bell shape whereby said end portion of said chain may be alternately tensioned and relaxed to cause successive links in said chain to slide against and successively strike said upper portion of said bell to generate high frequency sound waves.

2. A training collar according to claim 1, including an additional sound generating means in the form of a rod member of hard metal corresponding to the material of said chain bent midway to define one vertex of a triangular shape, the respective end portions of said rod then being bent towards each other to define the base angles of said triangular shape, the extreme ends being bent upwardly towards said vertex in parallel adjacent relationship to each other, said triangular shape being coupled to one of the links in said remaining portion of said chain and so dimensioned that it cannot pass through said bell so that said triangular shape serves the dual function of picking up and emitting sound when said end portion of said chain is caused to slide along said bell and serving as an anti-choke means by defining a minimum size for the loop formed by said remaining portion of said chain.

3. A method of training a dog comprising the steps of: causing a high frequency sound to be emitted simultaneously with a spoken word; subsequently speaking said word without emitting any high frequency sound; then speaking said word a third time and simultaneously emitting said high frequency sound; and repeating alternate emitting of said high frequency sound with said spoken word until said dog responds without the benefit of said high frequency sound.

References Cited by the Examiner
UNITED STATES PATENTS

| | | | |
|---|---|---|---|
| 2,616,394 | 11/52 | Elsinger | 119—106 |
| 2,743,702 | 5/56 | Sullivan | 119—106 |

FOREIGN PATENTS

| | | |
|---|---|---|
| 838,093 | 6/60 | Great Britain. |
| 859,856 | 1/61 | Great Britain. |
| 177,878 | 9/35 | Switzerland. |

SAMUEL KOREN, Primary Examiner.
ALDRICH F. MEDBERY, Examiner.